(12) United States Patent
Hummel et al.

(10) Patent No.: US 10,400,603 B2
(45) Date of Patent: Sep. 3, 2019

(54) MINI-DISK FOR GAS TURBINE ENGINE

(71) Applicant: United Technologies Corporation, Farmington, CT (US)

(72) Inventors: Raymond S. Hummel, South Windsor, CT (US); Julian Partyka, West Springfield, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 535 days.

(21) Appl. No.: 15/190,398

(22) Filed: Jun. 23, 2016

(65) Prior Publication Data
US 2017/0370226 A1 Dec. 28, 2017

(51) Int. Cl.
F01D 5/06 (2006.01)
F01D 11/00 (2006.01)
F01D 5/08 (2006.01)
F01D 5/02 (2006.01)
F01D 25/08 (2006.01)
F04D 29/32 (2006.01)

(52) U.S. Cl.
CPC ............. F01D 5/066 (2013.01); F01D 5/027 (2013.01); F01D 5/08 (2013.01); F01D 5/082 (2013.01); F01D 5/087 (2013.01); F01D 11/00 (2013.01); F01D 25/08 (2013.01); F04D 29/321 (2013.01); F05D 2220/32 (2013.01); F05D 2260/941 (2013.01)

(58) Field of Classification Search
CPC .................................................. F05D 2260/15
See application file for complete search history.

(56) References Cited

U.S. PATENT DOCUMENTS 4,361,213 A * 11/1982 Landis, Jr. ............... F01D 11/02
    188/378
5,288,210 A * 2/1994 Albrecht ................. F01D 5/066
    416/198 A (Continued)

FOREIGN PATENT DOCUMENTS

EP      2474707 A2    7/2012
EP      2546462 A2    1/2013

(Continued)

OTHER PUBLICATIONS

European Search Report, European Application No. 17177498.7, dated Nov. 23, 2017, European Patent Office; European Search Report 7 pages.

Primary Examiner — Dwayne J White
Assistant Examiner — Jason G Davis
(74) Attorney, Agent, or Firm — Cantor Colburn LLP

(57) ABSTRACT

Mini-disks of gas turbine engines are provided having an axially extending portion extending axially with respect to an axis of the engine, the axially extending portion configured to engage with a hub arm of a compressor of the engine, a radially extending portion extends radially with respect to the axis, the radially extending portion configured to engage with an attachment of a turbine disk of the gas turbine engine, an intermediate portion extending between the axially extending portion and the radially extending portion, and at least one mini-disk connector configured to engage with a portion of the turbine disk of the gas turbine engine to prevent radial movement of the mini-disk during operation.

18 Claims, 4 Drawing Sheets

(56) References Cited

U.S. PATENT DOCUMENTS

| | | | |
|---|---|---|---|
| 8,087,249 B2* | 1/2012 | Ottaviano | F02C 3/08 |
| | | | 60/726 |
| 10,087,761 B2* | 10/2018 | Calvert | F01D 17/02 |
| 2013/0323010 A1 | 12/2013 | Mosley et al. | |
| 2015/0096304 A1* | 4/2015 | von der Esch | F01D 5/06 |
| | | | 60/796 |

FOREIGN PATENT DOCUMENTS

| | | |
|---|---|---|
| WO | 2014120135 A1 | 8/2014 |
| WO | 2014150182 A1 | 9/2014 |

\* cited by examiner

MINI-DISK FOR GAS TURBINE ENGINE

BACKGROUND

The subject matter disclosed herein generally relates to gas turbine engines and, more particularly, to mini-disks for gas turbine engines.

Gas turbine engines include a plurality of elements, each subject to various stresses, loads, etc. Due to the operational conditions within the engines, certain components and/or parts may have shorter operational life spans than other components or parts. Accordingly, it may be advantageous to provide improved life components for gas turbine engines.

For example, a mini-disk may be a life-limiting part of a gas turbine engine. In some configurations, a mini-disk may be positioned between a turbine disk and a supply of hot gases. Further, the mini-disk may be located at a position radially within the gas turbine engine that is self-supporting. Thus, the mini-disk may be subject to high loads and/or stresses, e.g., thermal stresses. Due to high thermal loads and/or high loads due to the rotation of the components of the engine, the mini-disk may suffer failure prior to other components of the gas turbine engine. Accordingly, an improved life mini-disk is desirable.

SUMMARY

According to one embodiment, a mini-disk of a gas turbine engine having an axis is provided. The mini-disk includes an axially extending portion extending axially with respect to the axis of the gas turbine engine, the axially extending portion configured to engage with a hub arm of a compressor of the gas turbine engine, a radially extending portion extending radially with respect to the axis of the gas turbine engine, the radially extending portion configured to engage with an attachment of a turbine disk of the gas turbine engine, an intermediate portion extending between the axially extending portion and the radially extending portion, and at least one mini-disk connector configured to engage with a portion of the turbine disk of the gas turbine engine to prevent radial movement of the mini-disk during operation.

In addition to one or more of the features described above, or as an alternative, further embodiments of the mini-disk may include that the at least one mini-disk connector comprises a first mini-disk connector and a second mini-disk connector, wherein the first mini-disk connector is located at a junction between the intermediate portion and the radially extending portion and the second mini-disk connector is located at a junction between the intermediate portion and the axially extending portion.

In addition to one or more of the features described above, or as an alternative, further embodiments of the mini-disk may include that the axially extending portion forms a portion of a main rotor stack of the gas turbine engine.

In addition to one or more of the features described above, or as an alternative, further embodiments of the mini-disk may include at least one balancing element configured to balance a torque transmission of the mini-disk during operation.

In addition to one or more of the features described above, or as an alternative, further embodiments of the mini-disk may include that the at least one balancing element comprises a first balancing element located at a junction between the axially extending portion and the intermediate portion.

In addition to one or more of the features described above, or as an alternative, further embodiments of the mini-disk may include that the first balancing element is configured to engage with a portion of the turbine disk.

In addition to one or more of the features described above, or as an alternative, further embodiments of the mini-disk may include that the at least one balancing element further comprises a second balancing element located on the axially extending portion proximate the engagement with the hub arm of the compressor.

In addition to one or more of the features described above, or as an alternative, further embodiments of the mini-disk may include a discourager extending from at least one of the radially extending portion, the intermediate portion, or a junction between the intermediate portion and the radially extending portion, wherein the discourager is configured to discourage air flow along a surface of the mini-disk.

In addition to one or more of the features described above, or as an alternative, further embodiments of the mini-disk may include a heat shield configured to thermally protect the axially extending portion from high temperatures.

In addition to one or more of the features described above, or as an alternative, further embodiments of the mini-disk may include a heat shield connector configured to fixedly connect the heat shield to the mini-disk.

In addition to one or more of the features described above, or as an alternative, further embodiments of the mini-disk may include one or more seals configured to control airflow proximate the axially extending portion.

In addition to one or more of the features described above, or as an alternative, further embodiments of the mini-disk may include that the intermediate portion is defined by a curved arm that extends from the axially extending portion to the radially extending portion.

In addition to one or more of the features described above, or as an alternative, further embodiments of the mini-disk may include that the radially extending portion includes an aperture configured to allow airflow to pass through the radially extending portion of the mini-disk.

According to another embodiment, a gas turbine engine having an axis is provided. The gas turbine engine includes a turbine disk having an attachment and at least one disk connector, a compressor hub arm axially forward of the turbine disk, and a mini-disk configured between the turbine disk and the compressor hub arm. The mini-disk includes an axially extending portion extending axially with respect to the axis of the gas turbine engine, the axially extending portion configured to engage with the compressor hub arm, a radially extending portion extending radially with respect to the axis of the gas turbine engine, the radially extending portion configured to engage with the attachment of the turbine disk, an intermediate portion extending between the axially extending portion and the radially extending portion, and at least one mini-disk connector configured to engage with the at least one disk connector to prevent radial movement of the mini-disk during operation.

In addition to one or more of the features described above, or as an alternative, further embodiments of the gas turbine engine may include that the at least one disk connector comprises a first disk connector and a second disk connector and the at least one mini-disk connector comprises a first mini-disk connector and a second mini-disk connector, wherein the first mini-disk connector is located at a junction between the intermediate portion and the radially extending portion and the second mini-disk connector is located at a junction between the intermediate portion and the axially extending portion, and the first mini-disk connector engages with the first disk connector and the second mini-disk connector engages with the second disk connector.

In addition to one or more of the features described above, or as an alternative, further embodiments of the gas turbine engine may include that the axially extending portion, the compressor hub arm, and the turbine disk form a portion of a main rotor stack of the gas turbine engine.

In addition to one or more of the features described above, or as an alternative, further embodiments of the gas turbine engine may include that the mini-disk further includes at least one balancing element configured to balance a torque transmission of the mini-disk during operation.

In addition to one or more of the features described above, or as an alternative, further embodiments of the gas turbine engine may include that the at least one balancing element comprises a first balancing element located at a junction between the axially extending portion and the intermediate portion and configured to engage with a portion of the turbine disk.

In addition to one or more of the features described above, or as an alternative, further embodiments of the gas turbine engine may include that the mini-disk further includes a discourager extending from at least one of the radially extending portion, the intermediate portion, or a junction between the intermediate portion and the radially extending portion, wherein the discourager is configured to discourage air flow along a surface of the mini-disk.

In addition to one or more of the features described above, or as an alternative, further embodiments of the gas turbine engine may include a heat shield positioned along the axially extending portion of the mini-disk and configured to thermally protect the axially extending portion from high temperatures.

In addition to one or more of the features described above, or as an alternative, further embodiments of the gas turbine engine may include that the intermediate portion is defined by a curved arm that extends from the axially extending portion to the radially extending portion.

In addition to one or more of the features described above, or as an alternative, further embodiments of the gas turbine engine may include that the radially extending portion includes an aperture configured to allow airflow to pass through the radially extending portion of the mini-disk.

Technical effects of embodiments of the present disclosure include a mini-disk for a gas turbine engine having improved life. Further technical effects include a mini-disk for a gas turbine engine forming a part of a main rotor stack of the gas turbine engine. Further technical effects include a mini-disk for a gas turbine engine without a bore, but being radially constrained.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
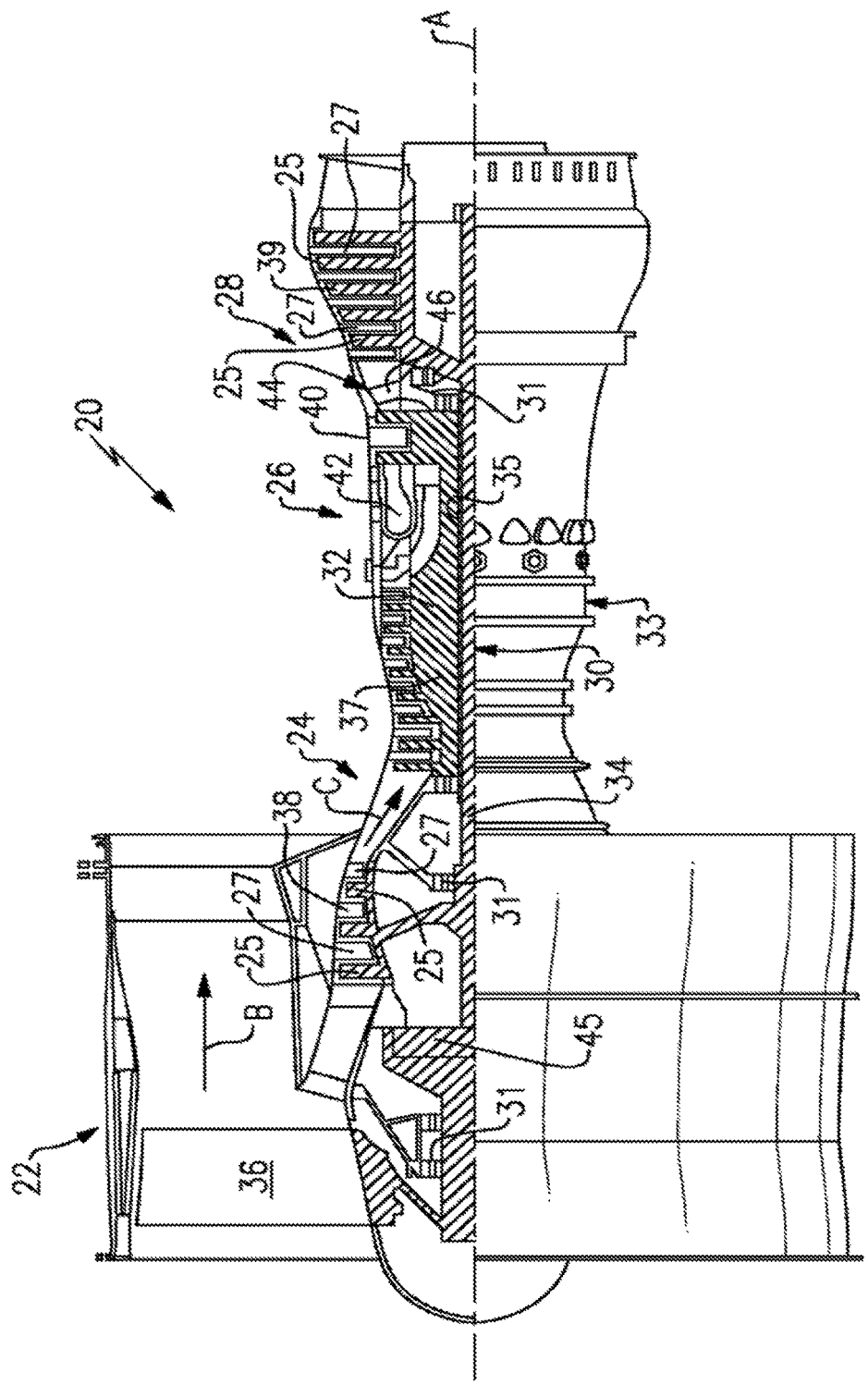
FIG. 1A is a schematic cross-sectional illustration of a gas turbine engine that may employ various embodiments disclosed herein.

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "##" that is shown in FIG. X may be labeled "X##" and a similar feature in FIG. Z may be labeled "Z##." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(T_{ram} \, ° R)/(518.7° R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
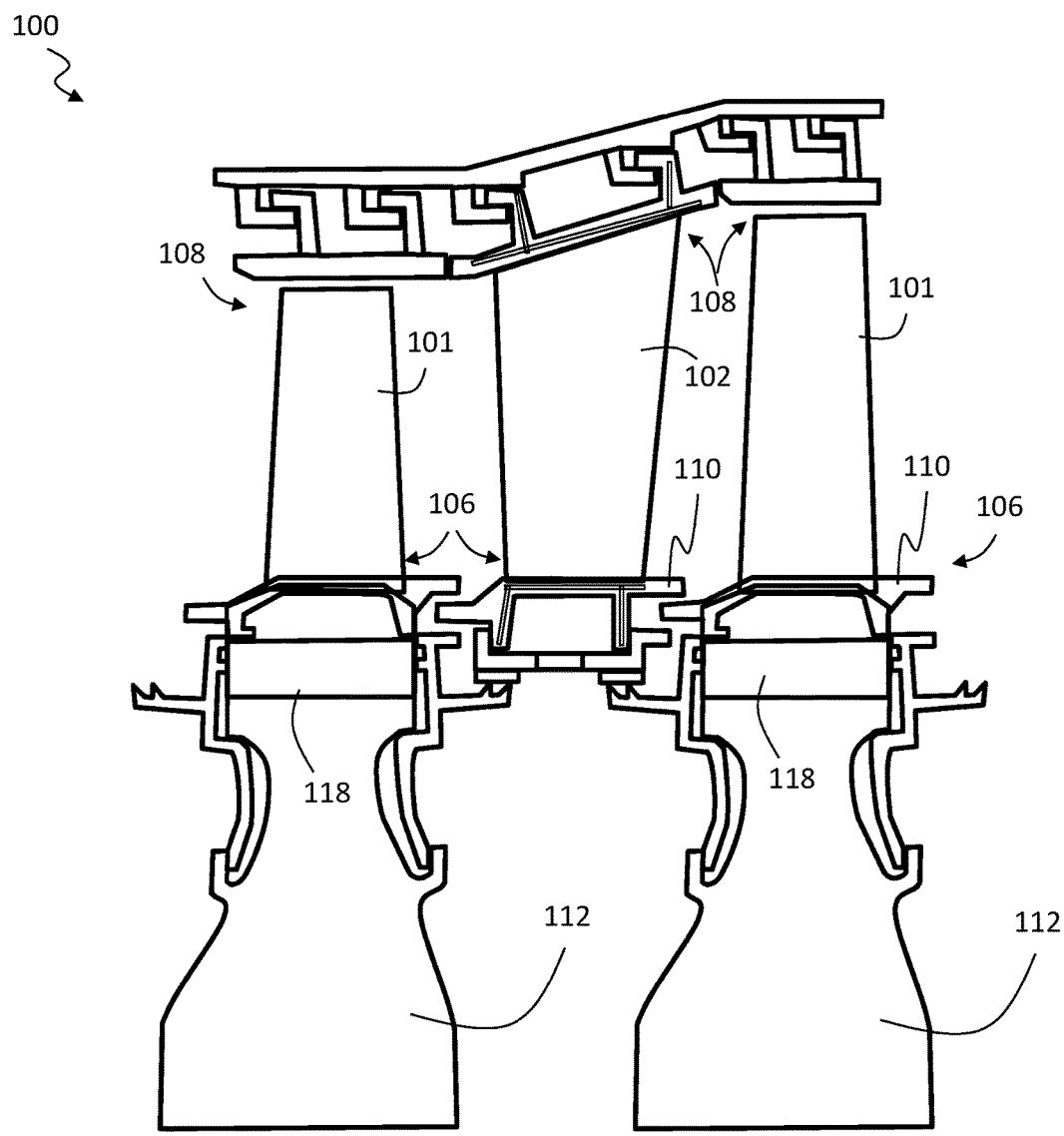
FIG. 1B is a schematic illustration of a turbine that may employ various embodiments disclosed herein.

FIG. 1B is a schematic view of a turbine section that may employ various embodiments disclosed herein. Turbine 100 includes a plurality of airfoils, including, for example, one or more blades 101 and vanes 102. The airfoils 101, 102 may be hollow bodies with internal cavities defining a number of channels or cavities, hereinafter airfoil cavities, formed therein and extending from an inner diameter 106 to an outer diameter 108, or vice-versa. The airfoil cavities may be separated by partitions within the airfoils 101, 102 that may extend either from the inner diameter 106 or the outer diameter 108 of the airfoil 101, 102. The partitions may extend for a portion of the length of the airfoil 101, 102, but may stop or end prior to forming a complete wall within the airfoil 101, 102. Thus, each of the airfoil cavities may be fluidly connected and form a fluid path within the respective airfoil 101, 102. The blades 101 and the vanes may include platforms 110 located proximal to the inner diameter thereof. Located below the platforms 110 may be airflow ports and/or bleed orifices that enable air to bleed from the internal cavities of the airfoils 101, 102. A root of the airfoil may connected to or be part of the platform 110. The platform 110 may be mounted to an attachment 118 of a turbine disk 112.

Figure 2:
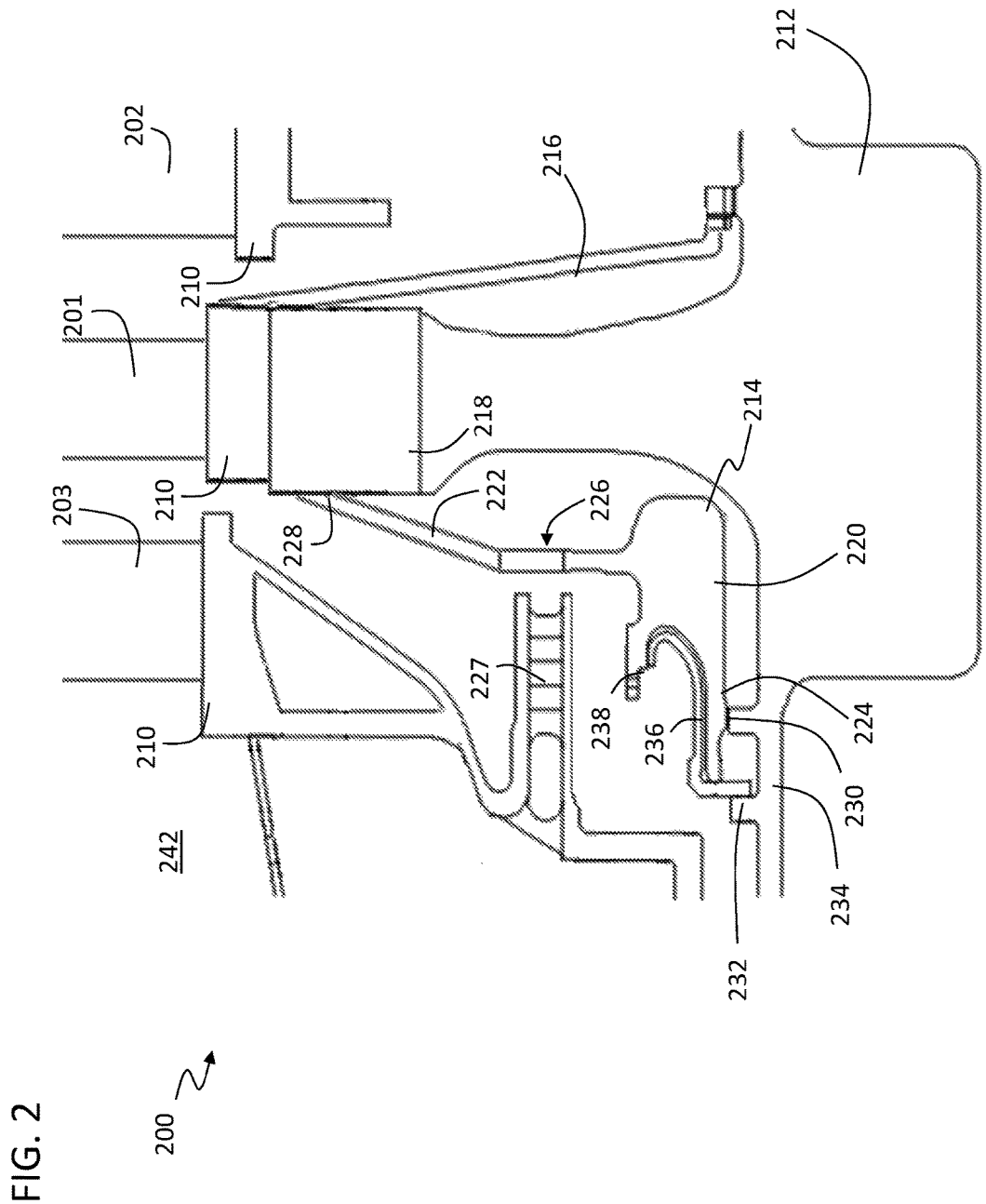
FIG. 2 is a schematic illustration of a portion of a turbine showing a mini-disk configuration.

Turning now to FIG. 2, an enlarged detailed schematic illustration of a turbine 200 is shown. As shown in FIG. 2, an inlet guide airfoil 203 is configured downstream from a combustor 242. Inlet guide airfoil 203, in some engine configurations, comprises a vane that is suspended from a turbine case at its outer diameter end. An airfoil 201 extends from a platform 210 that is coupled to a turbine disk 212. The turbine disk 212 may be a first stage rotor disk of the turbine 200.

As shown, the turbine disk 212 includes a forward mini-disk 214 and an aft seal plate 216. The forward mini-disk 214 may be configured to seal against an attachment 218 of the disk 212, and further may be configured to direct cooling air (not shown) into a rim slot of the attachment 218. Aft seal plate 216 may be configured to prevent escape of the cooling air into a cavity downstream of the turbine disk 212.

Hot combustion gases may be generated within combustor 242 upstream of the turbine 200 and flow through a gas path that is located and defined between axially adjacent airfoils and portions of the turbine 200. For example, inlet guide airfoil 203 may turn a flow air to improve incidence on the next airfoil 201 of the 200. As such, the airfoil 201 may be able to extract energy from the air efficiently. Likewise, a subsequent airfoil 202 may turn the flow of the air from the airfoil 201 to improve incidence on a subsequent airfoil (not shown). The air flow may impact the airfoils 201 to cause rotation of associated turbine disks 212 and rotor disk (not shown) about the engine centerline longitudinal axis (e.g., axis A of FIG. 1A). Cooling air may be routed from a high pressure compressor to the turbine 200, e.g., so that cool air can enter internal cooling channels of the airfoils 201, 202, 203 without having to pass through any non-rotating components when turbine 200 is operating.

The mini-disk 214 may include a bore 220, a web 222 extending radially from the bore 220, and a base 224 extending axially from the bore 220. The web 222 may include an aperture 226 that enables air flowing through a tangential on-board injector 227 to pass through the web 222. The web 222 further includes a web tip 228 at an end of the web 222. The web tip 228 may be figured form a seal or fit with the attachment 218. For example, the web tip 228 may engage in an interference fit or snap fit with a surface of the attachment 218.

The base 224 of the mini-disk 214 may include a first connector 230 and a second connector 232. The first and second connectors 230, 232 may be configured to connect to a hub arm 234 of the turbine disk 212. In some embodiment, as shown, an optional heat shield 236 may be positioned about the base 224 and the bore 220 and fit to a balance flange 238 of the mini-disk 214.

The mini-disk may be subject to high stresses and/or temperatures. It may be advantageous to transfer loads into the turbine disk, to thus reduce stresses on the mini-disk, and thus increase the life of the mini-disk. Accordingly, embodiments as provided herein enable a mechanism for reducing loads on the mini-disk and/or enable transference of loads from the mini-disk to the turbine disk.

The mini-disk 214 operates as an air seal attached to the front of the turbine disk 212 with a radial interference fit on the inner diameter of the mini-disk 214 (e.g., first connector 230) and an axial interference fit at the outer diameter of the mini-disk 214 (e.g., web tip 228 and attachment 218). The air seal formed by the mini-disk 214 is outside of and does not interact with the main rotor stack (e.g., hub arm 234, turbine disk 212, etc.). The main rotor stack includes a connection between the turbine disk hub arm 234 and a compressor section hub arm (not shown). In some configurations, the connection between the hub arms can include a curvic interface, as known in the art.

The air seal functions to direct TOBI discharge air up to the front of the rim of turbine disk 212 and into the airfoil 201 to provide cooling. The air seal is self-supporting and incorporates the bore 220 to provide necessary radial restraint required to keep the first connector 230 tight and stresses throughout the mini-disk 214 within acceptable limits during operation. Due to space limitation within some high pressure turbine rotor architectures, the air seal bore (i.e., bore 220) may be too small and located at too high of a diameter to provide adequate radial restraint. This may result in loss of the radial interference fit during operation (e.g., first connector 230). In addition, high stress and temperature at the location of first connector 230 may lead to additional interference fit loss due to creep of the mini-disk 214. The combination of interference fit loss due to operational loads and interference fit loss due to creep may limit or reduce part-life of the mini-disk 214.

Accordingly, in accordance with the present disclosure, embodiments provided herein are directed to an improved mini-disk. For example, in accordance with some embodiments of the present disclosure, the mini-disk and air seal architecture are changed such that the mini-disk is supported by two radial snaps on the mini-disk and the prior used bore to provide radial restraint is eliminated. In some embodiments, the mini-disk is incorporated into the main rotor stack of the gas turbine engine and, as such, is configured to transmit stack load. Furthermore, in accordance with some embodiment, a high pressure compressor-high pressure turbine interface (including a torque transmitting curvic joint) is moved from the turbine disk to the mini-disk.

Figure 3:
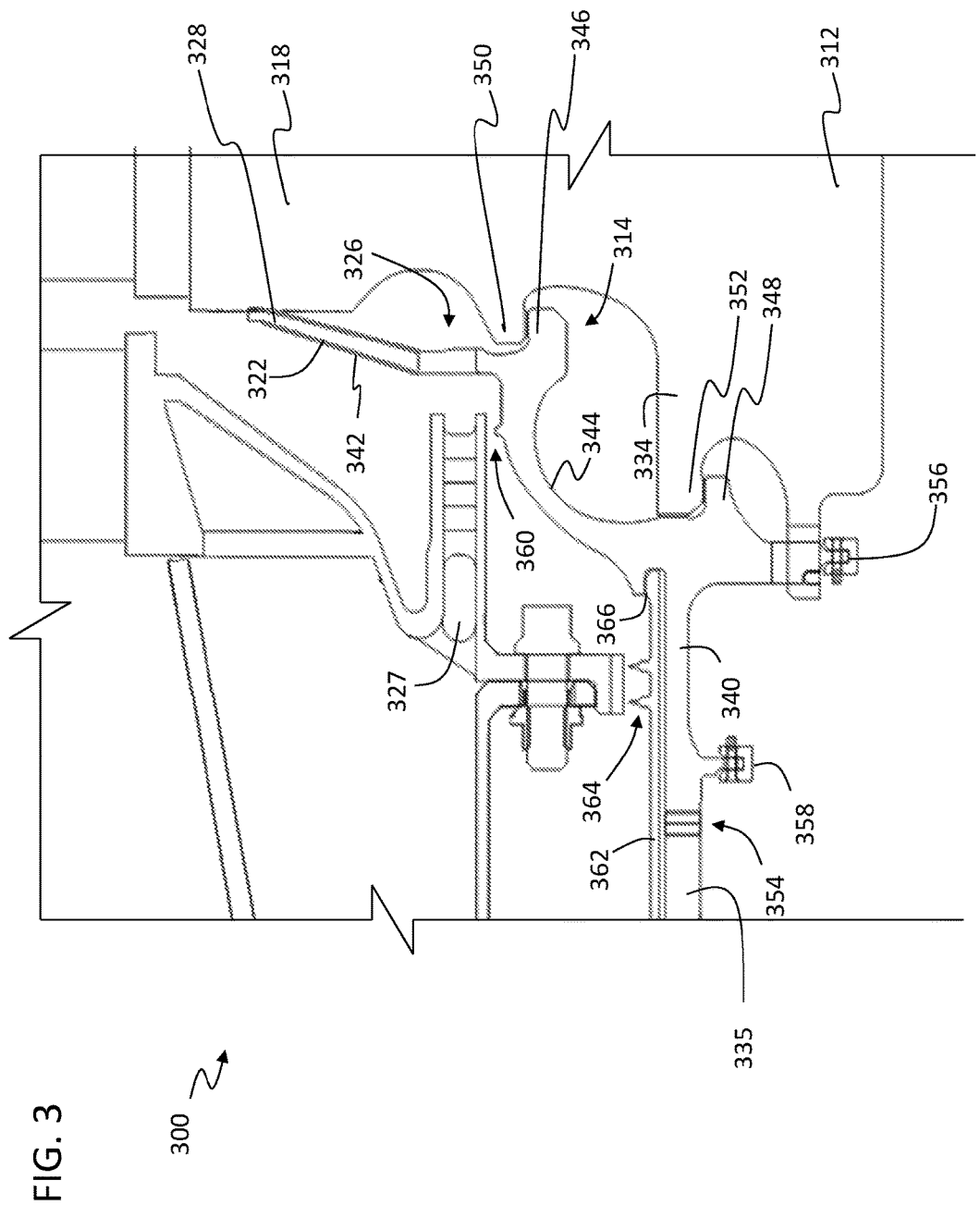
FIG. 3 is a schematic illustration of a gas turbine engine incorporating a mini-disk configuration in accordance with an embodiment of the present disclosure.

Turning now to FIG. 3, a schematic illustration of a turbine 300 in accordance with a non-limiting embodiment of the present disclosure is shown. As shown, the turbine 300 includes a turbine disk 312 and a mini-disk 314. The turbine disk 312, as shown, includes a hub arm 334 extending axially toward a compressor hub arm 335 and an attachment 318 extending radially. The mini-disk 314 is positioned between the hub arm 334 of the turbine disk 312 and the compressor hub arm 335 and also includes a web 322. That is, as shown, the mini-disk 314 has an axially extending portion 340, a radially extending portion 342 (e.g., a web), and an intermediate portion 344 that connects and extends between the axially extending portion 340 and the radially extending portion 342. The radially extending portion 342 can include an aperture 326 that enables air flowing through a tangential on-board injector 327 to pass through the radially extending portion 342, as described above. The radially extending portion 342 further includes a tip 328 that engages with the attachment 318 of the turbine disk 312.

In contrast to the configuration shown in FIG. 2, the mini-disk 314 does not include a bore. Rather, the mini-disk 314 includes a first mini-disk connector 346 and a second mini-disk connector 348. The first mini-disk connector 346 is located at a junction between the radially extending portion 342 and the intermediate portion 344 and is configured to engage with a first disk connector 350 of the turbine disk 312, thus forming a first engagement between the mini-disk 314 and the turbine disk 312. The second mini-disk connector 348 is located at a junction between the axially extending portion 340 and the intermediate portion 344 and is configured to engage with a second disk connector 352 of the turbine disk 312, thus forming a second engagement between the mini-disk 314 and the turbine disk 312. In various embodiments, the first and second engagements can be snap connections, interference fits, etc. as known in the art.

As will be apparent to those of skill in the art, in some embodiments or configurations, the first and second engagements between the mini-disk 314 and the turbine disk 312 can form air seals. However, in other embodiments, the first and second engagements can be configured to enable air to pass through the engagement interface and flow down to a disk bore. As such, in some non-limiting embodiments, the first and second engagements can be configured with slots or passages that form windows or airflow passages for air to flow through the first and/or second engagements.

Moreover, the first and second engagements can operate as radial supports for the mini-disk 314 relative to the turbine disk 312. That is, as the turbine 300 rotates, the outward radial movement of the mini-disk 314 can be constrained by the first and second engagements between the mini-disk 314 and the turbine disk 312. Accordingly, the mini-disk 314 can expand or move into contact with the turbine disk 312 at the first and second engagements, rather than lifting off of the turbine disk 312. Thus, the mini-disk 314 in accordance with the present disclosure eliminates the bore and includes two engagements with the turbine disk 312, and thus stresses and other operational parameters can be maintained within desired limits.

As noted above, the axially extending portion 340 of the mini-disk 314 extends between the turbine disk 312 and the compressor hub arm 335. That is, the mini-disk 314 is now incorporated into the main rotor stack. Because of this incorporation into the main rotor stack, the mini-disk 314 now includes a stack interface 354 that interfaces with the compressor hub arm 335. The stack interface 354, in some embodiments, is a curvic interface between the mini-disk 314 and the compressor hub arm 335. As such, a torque transmitting interface between a high pressure compressor and a high pressure turbine can be moved from the turbine disk to the mini-disk.

The intermediate portion 344, as shown, has a geometric shape. That is, in the embodiment of FIG. 3, the intermediate portion 344 can be defined as a curved arm. The curved arm structure of the intermediate portion 344 can be shaped and optimized to accommodate bending stresses of the intermediate portion 344.

The mini-disk 314 can include additional features, as shown in the non-limiting embodiment of FIG. 3. For example, the mini-disk 312 can include one or more balancing elements 356, 358. The balancing elements 356, 358 are provided to balance the interface between the mini-disk 314 and the turbine disk 312 (e.g., first balancing element 356) and between the mini-disk 314 and the compressor hub arm 335 (e.g., second balancing element 358). The balancing elements 356, 358 can provide torque transmitting functionality to balance operation of the main rotor stack that now includes the mini-disk 314. The first balancing element 356 can include one or more components. For example, as shown, the first balancing element 356 is defined as a flange with a weight fixedly attached thereto. Further, as shown, the first balancing element 356 is configured to engage with a portion of the turbine disk 312. The second balancing element 358, as shown, also includes a flange and weight fixedly attached thereto.

The mini-disk 314, as shown, also includes a discourager 360. The discourager 360 is configured to discourage or minimize airflow to pass between the mini-disk 314 and the tangential on-board injector 327. The discourage 360 is thus formed on the mini-disk 314 on the intermediate portion 344, on the radial portion 342, or at the junction between the intermediate portion 344 and the radial portion 342.

Further, as shown, a heat shield 362 can be configured along the axially extending portion 340 and continue over the stack interface 354 and the compressor hub arm 335. The heat shield 352 can include one or more seals 364 that are configured to provide fluid seals to prevent high temperature air from impinging on the mini-disk 314. The heat shield 362 is configured to engage with the mini-disk 314 with a heat shield connector 366. The heat shield connector 366 forms an engagement between the heat shield 362 and the mini-disk 314 to secure the heat shield 362 thereto. The heat shield connector 366 can be a snap fit, interference fit, or may be an engaging structure or feature as known in the art, including by not limited to fasteners.

Advantageously, embodiments described herein provide a mini-disk for a gas turbine engine that enables radial snaps to be on a radially inboard side of a snap interface between the mini-disk and the turbine disk. During operation, the mini-disk can now radially load into the turbine disk snap rather than lifting off the snap, ensuring a tight radial fit at all operating conditions. Accordingly, lower mini-disk stresses may occur and no fit loss will result due to creep. The outer radial snap (e.g., elements 346, 350 in FIG. 3) can provide additional mechanical restraint ensuring mini-disk stresses are kept within the allowable limits.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although an aero or aircraft engine application is shown and described above, those of skill in the art will appreciate that turbine disk configurations as described herein may be applied to industrial applications and/or industrial gas turbine engines, land based or otherwise.

Further, although described and shown with various example geometries and configurations of both the radial load feature and the expansion feature, those of skill in the art will appreciate that variations on the disclosed shapes, geometries, etc. may be made without departing from the scope of the present disclosure.

Accordingly, the present disclosure is not to be seen as limited by the foregoing description, but is only limited by the scope of the appended claims.

What is claimed is:

1. A mini-disk of a gas turbine engine having an axis comprising:
    an axially extending portion extending axially with respect to the axis of the gas turbine engine, the axially extending portion configured to engage with a hub arm of a compressor of the gas turbine engine;
    a radially extending portion extending radially with respect to the axis of the gas turbine engine, the radially extending portion configured to engage with an attachment of a turbine disk of the gas turbine engine;
    an intermediate portion extending between the axially extending portion and the radially extending portion;
    at least one mini-disk connector configured to engage with a portion of the turbine disk of the gas turbine engine to prevent radial movement of the mini-disk during operation; and
    at least one balancing element configured to balance a torque transmission of the mini-disk during operation, the at least one balancing element including a first balancing element located proximate a junction between the axially extending portion and the intermediate portion and extending radially inward from the junction between the axially extending portion and the intermediate portion.

2. The mini-disk of claim 1, wherein the at least one mini-disk connector comprises a first mini-disk connector and a second mini-disk connector, wherein the first mini-disk connector is located at a junction between the intermediate portion and the radially extending portion and the second mini-disk connector is located at a junction between the intermediate portion and the axially extending portion.

3. The mini-disk of claim 1, wherein the axially extending portion forms a portion of a main rotor stack of the gas turbine engine.

4. The mini-disk of claim 1, wherein the first balancing element is configured to engage with a portion of the turbine disk.

5. The mini-disk of claim 1, wherein the at least one balancing element further comprises a second balancing element located on the axially extending portion proximate the engagement with the hub arm of the compressor.

6. The mini-disk of claim 1, further comprising a discourager extending from one of the radially extending portion, the intermediate portion, or a junction between the intermediate portion and the radially extending portion, wherein the discourager is configured to discourage air flow along a surface of the mini-disk.

7. The mini-disk of claim 1, further comprising a heat shield configured to thermally protect the axially extending portion from impinging air.

8. The mini-disk of claim 7, further comprising a heat shield connector configured to fixedly connect the heat shield to the mini-disk.

9. The mini-disk of claim 7, further comprising one or more seals configured to control airflow proximate the axially extending portion.

10. The mini-disk of claim 1, wherein the intermediate portion is defined by a curved arm that extends from the axially extending portion to the radially extending portion.

11. The mini-disk of claim 1, wherein the radially extending portion includes an aperture configured to allow airflow to pass through the radially extending portion of the mini-disk.

12. A gas turbine engine having an axis comprising:
a turbine disk having an attachment and at least one disk connector;
a compressor hub arm axially forward of the turbine disk; and
a mini-disk configured between the turbine disk and the compressor hub arm, the mini-disk comprising:
an axially extending portion extending axially with respect to the axis of the gas turbine engine, the axially extending portion configured to engage with the compressor hub arm;
a radially extending portion extending radially with respect to the axis of the gas turbine engine, the radially extending portion configured to engage with the attachment of the turbine disk;
an intermediate portion extending between the axially extending portion and the radially extending portion; and
at least one balancing element configured to balance a torque transmission of the mini-disk during operation, the at least one balancing element including a first balancing element located proximate a junction between the axially extending portion and the intermediate portion and extending radially inward from the junction between the axially extending portion and the intermediate portion; and
at least one mini-disk connector configured to engage with the at least one disk connector to prevent radial movement of the mini-disk during operation.

13. The gas turbine engine of claim 12,
wherein the at least one disk connector comprises a first disk connector and a second disk connector and the at least one mini-disk connector comprises a first mini-disk connector and a second mini-disk connector,
wherein the first mini-disk connector is located at a junction between the intermediate portion and the radially extending portion and the second mini-disk connector is located at a junction between the intermediate portion and the axially extending portion,
and the first mini-disk connector engages with the first disk connector and the second mini-disk connector engages with the second disk connector.

14. The gas turbine engine of claim 12, wherein the axially extending portion, the compressor hub arm, and the turbine disk form a portion of a main rotor stack of the gas turbine engine.

15. The gas turbine engine of claim 12, further comprising a heat shield positioned along the axially extending portion of the mini-disk and configured to thermally protect the axially extending portion from impinging air.

16. The gas turbine engine of claim 12, wherein the intermediate portion is defined by a curved arm that extends from the axially extending portion to the radially extending portion.

17. The gas turbine engine of claim 12, wherein the radially extending portion includes an aperture configured to allow airflow to pass through the radially extending portion of the mini-disk.

18. A mini-disk of a gas turbine engine having an axis comprising:
an axially extending portion extending axially with respect to the axis of the gas turbine engine, the axially extending portion configured to engage with a hub arm of a compressor of the gas turbine engine;
a radially extending portion extending radially with respect to the axis of the gas turbine engine, the radially extending portion configured to engage with an attachment of a turbine disk of the gas turbine engine;
an intermediate portion extending between the axially extending portion and the radially extending portion;
at least one mini-disk connector configured to engage with a portion of the turbine disk of the gas turbine engine to prevent radial movement of the mini-disk during operation,
wherein the axially extending portion of the mini-disk is configured to transmit engine axial stack load and includes a torque transmitting curvic interface to transmit a high pressure compressor torque to a high pressure turbine.

* * * * *